United States Patent Office 3,113,132
Patented Dec. 3, 1963

---

3,113,132
SYNTHESIS OF CHLORINATED ALKYL-
PYRAZINES
George E. Baxter and William W. Levis, Jr., Wyandotte, Mich., assignors to Wyandotte Chemicals Corporation, Wyandotte, Mich., a corporation of Michigan
No Drawing. Filed Mar. 17, 1961, Ser. No. 96,351
13 Claims. (Cl. 260—250)

This invention relates to a method for the synthesis of chlorinated alkylpyrazines. More particularly, it relates to a method for synthesizing nuclear monochlorinated alkylpyrazines in liquid phase. Still more particularly it relates to chlorinated alkylpyrazines synthesized by the nuclear monochlorination of an alkylpyrazine selected from the group consisting of methylpyrazine, ethylpyrazine, 2,5-dimethylpyrazine and 2,5-diethylpyrazine.

2-chloro-3-methyl-, 2-chloro-3-ethyl-, 3-chloro-2,5-dimethyl- and 3-chloro-2,5-diethylpyrazines are known compounds whose chemical and physical properties make them of interest as intermediates in many fields of application including polymers, pesticides, pharmaceuticals and rubber chemistry. In spite of their many interesting chemical and physical properties these compounds have heretofore been little more than laboratory curiosities because they have been obtainable only through difficult and costly syntheses.

Little has been known heretofore of the nuclear chlorinated alkylpyrazines because the starting materials for their syntheses have not been readily available. In fact, it was thought that the chlorination of an alkylpyrazine would only produce chloro derivatives in which the chlorine is attached to the alkyl group. This thought was based on the numerous references teaching the classical chlorinations of alkyl-substituted aromatics wherein the reaction can be controlled specifically so that the hydrogen atom, or atoms, of the alkyl group is substituted with chlorine. Subsequently, Karmas and Spoerri, Jour. Am. Chem. Soc., 74, 1580 (1952), devised a method for synthesizing 2-chloro-3-methylpyrazine and 3-chloro-2,5-dimethylpyrazine which comprised making 2-hydroxy-3-methylpyrazine and 3-hydroxy-2,5-dimethylpyrazine and then reacting the hydroxy compound with phosphorus oxychloride. These reactions may be represented as follows:

ROH + POCl₃ ——→

The above type of reaction is not commercially feasible in that it is somewhat difficult to carry out as well as costly.

Therefore, it is an object of this invention to provide a new method for synthesizing 2-chloro-3-methyl-, 2-chloro-3-ethyl-, 3-chloro-2,5-dimethyl- and 3-chloro-2,5-diethylpyrazines.

It is a further object of this invention to provide an efficient, continuous and economically attractive process for synthesizing 2-chloro-3-methyl-, 2-chloro-3-ethyl-, 3-chloro-2,5-dimethyl- and 3-chloro-2,5-diethylpyrazines.

Other objects and advantages of this invention will become apparent from the following detailed description thereof.

In accordance with this invention there is provided a method of making 2-chloro-3-methyl-, 2-chloro-3-ethyl, 3-chloro-2,5-dimethyl-, and 3-chloro-2,5-diethylpyrazine which comprises adding the alkylpyrazine to be chlorinated to a mixture of water, chlorine and inert solvent. The amount of chlorine present in the solvent must be a minimum of 1% by weight of the solvent and the amount of water must be from about .01% to 10% by weight of the total amount of alkylpyrazine to be added. The conversions we have obtained using this method are consistently higher than 65%.

The determination of the molecular structure of the chlorinated alkylpyrazine products of the process of this invention was based on comparisons of derivatives of the chloropyrazines with compounds of unequivocal structure as well as on physical data. For example, 2-chloro-3-methylpyrazine, prepared by the method of this invention, was hydrolyzed with aqueous alkali to form 2-hydroxy-3-methylpyrazine. 2-hydroxy-3-methylpyrazine was also prepared from alanineamide and glyoxal and this was shown to be identical with the compound prepared by the alkaline hydrolysis of 2-chloro-3-methylpyrazine. Infrared spectra analysis of the hydrolyzed chloro derivative revealed it existed as a tautomeric keto form corresponding to 2-hydroxy-3-methyl-pyrazine. Had the chloro derivative given hydroxymethylpyrazine upon hydrolysis, then a tautomeric keto form would not be possible. Both nuclear magnetic resonance spectroscopy and the dipole moment of 2-chloro-3-methylpyrazine furnished additional confirmation of molecular structure.

For undetermined reasons, the method of this invention is only applicable to the chlorination of methylpyrazine, ethylpyrazine, 2,5-dimethylpyrazine and 2,5-diethylpyrazine. Attempts to chlorinate other pyrazine have not been successful. For example, no chlorination product of 2,6-dimethylpyrazine or pyrazine itself could be obtained and the chlorination of tetramethylpyrazine gave only questionable traces of a monochloro compound. Generally, when dealing with the alkylpyrazines which could not be chlorinated it was possible to recover the reactants. It should also be mentioned that it was impossible to dichlorinate any of the pyrazines including those compounds which did lend themselves to monochlorination.

The solvent used in this method can be any solvent in which chlorine and the alkylpyrazine are soluble to an extent whereby sufficient amounts of reactants will be brought into contact to have a commercially feasible reaction and which is inert to the chlorination reaction. We have found that carbon tetrachloride and chloroform are excellent solvents for use in the method of this invention.

The chlorination reaction may be carried out within a temperature range from about 25° C. to about the boiling point of the solvent. For example, if carbon tetrachloride were used as the solvent the range would be from about 25° C. to about 76° C. assuming the chlorination is carried out at atmospheric pressure. It was found that it was not practical to carry out the chlorination at a temperature less than about 25° C. due to the slow rate of reaction.

The method of this invention is not restricted to the use of any particular reaction pressure although atmospheric pressure is preferred. As was discussed earlier, the upper temperature limitation is the boiling point of the solvent, therefore, it is quite possible to extend the temperature range over which the chlorination reaction may be carried out by increasing the pressure within the reaction vessel. A further advantage of the use of superatmospheric pressure is that a greater amount of chlorine can be held in solution, thereby insuring that an excess of chlorine is present. Thus, superatmospheric pressure can be used wherein the upper limit is dictated primarily by equipment design and economic considerations. The use of less than atmospheric pressure is not recommended in that it would narrow the temperature range over which the reaction could be conducted and might prevent the solvent from holding enough chlorine to meet the requirements of the reaction.

That the above method indeed worked came as quite a surprise in that it was expected, in light of the prior art, that a chloro-substituted alkyl derivative would be obtained. In fact, pyrazines are not known to react readily towards electrophilic reagents. Typical of the patents found in the art is U.S. Patent No. 2,574,324, entitled "Manufacture of Pyrazines," Richard Paul Germann, patentee, which describes the chlorination of pyrazine in the vapor phase at a temperature of about 350° C. to 500° C. in the presence of sulfur dioxide to give predominantly the monochloro derivative. With such knowledge as given by the prior art a facile chlorination of an alkylpyrazine in solution at low temperature would be quite unexpected.

During the development of a manufacturing process for chlorinated alkylpyrazines it was determined to attempt the chlorination of alkylpyrazine at atmospheric pressure and at a temperature less than the boiling point of the solvent. Upon utilizing this approach, trouble was frequently encountered in initiating the chlorination reaction and/or continuing the reaction to completion. On a number of occasions considerable quantities of reactants were added to the mutual solvent with no reaction taking place. Then reaction would begin suddenly and violently and proceed uncontrollably until the reactants were expended.

It was then found that the concentration of chlorine in solution was a critical factor. If the alkylpyrazine were added to the solvent without any chlorine being present and then chlorine introduced it was impossible to tell what would happen. Most often no reaction took place. However, if chlorine was first passed into the solvent until its concentration therein was a minimum of 1% by weight of the solvent and then the alkylpyrazine added the reaction would take place within a short span of time. Although this discovery was a tremendous advance in securing a method for nuclear chlorinating pyrazines, a problem still remained when the method was applied as a continuous industrial process. This problem was that the chlorination reaction did not always initiate immediately upon the addition of the alkylpyrazine to the chlorine solvent mixture. Subsequently, it was found that if a slight amount of water was added to the reaction mixture the reaction would initiate immediately. This discovery gave an excellent continuous industrial process. The reason why the addition of water has this catalytic effect is not apparent at this time.

The water may be added directly to the solvent before addition of the alkylpyrazine or it may be fed into the solvent via a separate stream during the addition of the alkylpyrazine or it may be added directly to the alkylpyrazine and the two components introduced into the solvent through a single feed stream. Of these alternative methods, it has been found through experience that it is preferable to adopt the latter method because the water is apparently entrained in the exit gases, thereby being removed from the sphere of influence, and hence it is desirable to have a continuous addition of water which can easily be achieved by adding it via the alkylpyrazine feed. In practice, a small amount of the water is added directly to the solvent prior to the addition of the alkylpyrazine-water feed. A sufficient amount of water is from about .01% to 10% by weight of the alkylpyrazine feed stock with the preferred amount being about 1% by weight.

Another advantage to the use of a small amount of water is that an increase in production per unit volume is achieved. It has been found that the product precipitates as dense crystals in the presence of water thereby giving a thinner slurry which permits a greater batch size in the reactor, batch size being limited by the ability to stir the slurry.

It should be pointed out that the chlorination of the alkylpyrazine results in the formation of the nuclear monochlorinated alkylpyrazine hydrochloride. In the case of methylpyrazine, ethylpyrazine and 2,5-dimethylpyrazine the hydrochloride is insoluble and will precipitate out of solution. The 3-chloro-2,5-diethylpyrazine hydrochloride is soluble in the mixture and hence will not precipitate out. In either case, to obtain the "pure" chlorinated alkylpyrazine it is necessary to remove the hydrogen chloride from the molecule. This is done by treating the precipitate or reaction mixture with an alkaline solution which may be illustrated as follows:

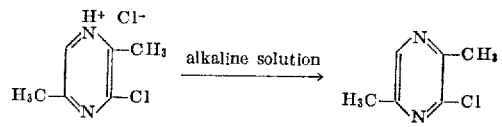

Since the alkylpyrazine bases are very weak the alkaline solution may be comprised of any alkaline material such as caustic soda, soda ash, and sodium phosphate. The alkaline solution should be an aqueous solution to avoid any side reactions. The removal of the hydrogen chloride can also be accomplished by dissolving the precipitate in water to hydrolyze the hydrochloride and then adding an alkaline solution to neutralize the hydrogen chloride. In the case of chlorodiethylpyrazine hydrochloride the water and alkaline solution may be added directly to the reacted mixture.

In the preferred embodiment of this invention liquid carbon tetrachloride at a temperature of about 35° C. to about 50° C. is essentially saturated with chlorine and then an alkylpyrazine, selected from the group consisting of methyl-, ethyl-, 2,5-dimethyl-, and 2,5-diethylpyrazine, is admixed with water, the water being about 1% by weight of the alkylpyrazine being added, and is added to the carbon tetrachloride at a rate such that the carbon tetrachloride temperature can be maintained from about 35° C. to about 50° C. Simultaneous to the addition of the alkylpyrazine and water, chlorine is passed through the carbon tetrachloride in at least a stoichiometric ratio, that is, a minimum amount of 1 mol of chlorine per each mol of alkylpyrazine added.

The term "essentially saturated" is employed in the above description of the invention because at any particular temperature and pressure carbon tetrachloride would be required to hold an exact amount of chlorine in order to be termed "saturated"; therefore, it was desired not to imply that this exact amount was present. An excess of chlorine may be employed in the method of this invention wherein the upper limit will be dictated primarily by economic considerations.

The chlorination of the alkylpyrazine is a highly exothermic reaction, hence it is necessary to carefully control the addition rate of the alkylpyrazine to the solvent in order to maintain a suitable reaction temperature. It is possible, of course, to provide external cooling to the reaction vessel in order to maintain temperature control.

Recovery of the product was found troublesome due to the presence of high boiling residues and sublimation of hydrochlorides. It was found that these problems would be avoided when working with 2-chloro-3-methyl-, 2-chloro-3-ethyl- and 3-chloro-2,5-dimethylpyrazine if the product hydrochloride was separated from the reaction mixture by filtration and the filter cake dissolved in water and made alkaline and then steam distilled. The occluded solvent and the chlorinated pyrazine were distilled over while the high boiling residues remained. The product was then recovered by fractional distillation. The steam distillation was done under slightly alkaline conditions since condensation reactions take place under acidic conditions resulting in a loss of product. It was also determined that it was advisable during the step of frictional distillation to add a mild base such as magnesium oxide to the stillpot to insure a neutral or slightly alkaline condition. Due to the fact that 3-chloro-2,5-diethylpyrazine hydrochloride is soluble in the reaction mixture, the product is recovered by techniques as illustrated in Example 4.

In regard to the recovery steps, it is not necessary that the product hydrochloride be separated from the reaction mixture prior to distilling and fractionating for it is equally as feasible to add an alkaline solution directly to the reaction mixture containing the product hydrochloride suspended in the solvent and steam distill directly.

Another advantage of this invention is that it lends itself especially well for use in a continuous process wherein the crude reaction product is put through a filter medium to separate the product and the filtrate is recycled as solvent.

The following examples are provided so as to more clearly illustrate the method of this invention to those skilled in the art and they should not be employed to unduly restrict the invention as disclosed and claimed herein. The terms "conversion" and "yield" are employed in this invention and are defined as follows:

$$\text{Percent conversion} = \frac{(\text{mols product obtained}) \times (100)}{(\text{mols reactants charged})}$$

$$\text{Percent yield} = \frac{(\text{mols product obtained}) \times (100)}{(\text{mols reactants charged}) - (\text{mols reactants recovered})}$$

Example 1

A charge of 5500 grams of carbon tetrachloride was placed into a 5-liter, 3-neck flask fitted with a stirrer, feed inlet tube, chlorine inlet tube, thermometer, and reflux condenser. The feed reservoir was charged with 756 grams (7 mols) of 2,5-dimethylpyrazine and 7 grams of water. Chlorine was bubbled into the solvent with stirring while the temperature of the solvent was raised to about 40° C. After a chlorine input of 190 grams the feed of dimethylpyrazine and water was started by means of a proportioning pump and the chlorine input was adjusted to a rate of little more than the stoichiometric equivalent for the production of 3-chloro-2,5-dimethylpyrazine. The reaction initiated immediately as evidenced by the precipitation of the product hydrochloride and by heat evolution. The simultaneous feed of dimethylpyrazine and chlorine was continued to completion with the temperature controlled to about 40 to 48° C. through the use of an ice bath and controlling the dimethylpyrazine feed rate. When the dimethylpyrazine addition was complete the temperature was raised, by removing the ice bath, to about 53° C. with a slow feed of chlorine into the reactor until the decline in temperature indicated completion of chlorination.

Filtration of the resulting product hydrochloride slurry gave 2650 grams of filter cake and 3063 grams of filtrate. The filter cake was dissolved in 500 grams of water and neutralized and made alkaline with an aqueous solution of 700 grams of 50% sodium hydroxide. The alkaline crude was steam distilled to completion giving 2528 grams of crude product and solvent which was charged to a stillpot along with 5 grams of magnesium oxide. Fractional distillation gave 870 grams (6.1 mols) of 3-chloro-2,5-dimethylpyrazine representing 87% yield.

Example 2

Utilizing the same equipment and by the identical procedure as used in Example 1 another run was made in which the solvent charge was the 3063 grams of filtrate from Example 1 made up to batch size with 2437 grams of fresh carbon tetrachloride and the dimethylpyrazine charge was 756 grams (7 mols) containing 7 grams of water.

Filtration of the resulting hydrochloride slurry gave 2331 grams of filter cake which was dissolved in water, neutralized and steam distilled, giving 2183 grams of crude product and solvent, in the same manner as in Example 1. Fractional distillation of the 2183 grams of steam distillate in the presence of 5 grams of magnesium oxide gave 861 grams (6.04 mols) of 3-chloro-2,5-dimethylpyrazine representing a yield of 86%.

Example 3

A charge of 5500 grams of carbon tetrachloride was placed into a 5-liter, 3-neck flask fitted with a stirrer, feed inlet tube, chlorine inlet tube, thermometer, and reflux condenser. The feed reservoir was charged with 564 grams (6 mols) of methylpyrazine and 6 grams of water. Chlorine was bubbled into the solvent with stirring while the temperature of the solvent was raised to about 39° C. After a chlorine input of 190 grams the feed of methylpyrazine and water was started by means of a proportioning pump and the chlorine input was adjusted to a rate of little more than the stoichiometric equivalent for the production of 2-chloro-3-methylpyrazine. The reaction initiated immediately as evidenced by the precipitation of the product hydrochloride and heat evolution. The simultaneous feed of methylpyrazine and chlorine was continued to completion with the temperature controlled to about 39 to 46° C. through the use of an ice bath and controlling the methylpyrazine feed rate. When the methylpyrazine addition was complete the temperature was raised, by removing the ice bath, to about 50° C. with a slow feed of chlorine into the reactor until the decline in temperature indicated completion of chlorination.

Filtration of the resulting product hydrochloride slurry gave 1526 grams of filter cake and 4535 grams of filtrate. The filter cake was dissolved in 500 grams of water and neutralized and made alkaline with an aqueous solution of 600 grams of 50% sodium hydroxide. The alkaline crude was steam distilled to completion giving 1546 grams of crude product and solvent which was charged to a stillpot along with 5 grams of magnesium oxide. Fractional distillation gave 574 grams (4.47 mols) of 2-chloro-3-methylpyrazine representing 75% conversion.

Example 4

Utilizing the same equipment as employed in Example 3, 2500 grams of carbon tetrachloride were placed into the flask. The feed reservoir was charged with 816 grams (6 mols) of 2,5-diethylpyrazine and 6 grams of water. 105 grams of chlorine were passed through the mixture of carbon tetrachloride and water while the mixture was heated to 40° C. The 2,5-diethylpyrazine and water was then introduced into the mixture by means of a proportioning pump and simultaneous therewith chlorine was passed into the mixture at a rate in slight excess of the stoichiometric equivalent for the production of 3-chloro-2,5-diethylpyrazine. The reaction initiated as soon as the feed of 2,5-diethylpyrazine and water was started as evidenced by a sudden rise in temperature. The simultaneous feed of diethylpyrazine and chlorine was continued to completion with the temperature controlled to about 40 to 49° C. by controlling the diethylpyrazine feed rate and the use of an ice bath. A decline in temperature indicated completion of the chlorination. Since 3-chloro-2,5-diethylpyrazine hydrochloride is soluble in the reaction mixture no precipitate was found.

The reaction mixture was neutralized and made alkaline with an aqueous solution of 800 grams of 50% sodium hydroxide and then filtered to remove the precipitated salt. The filtrate was separated into two layers. The aqueous layer was treated with sodium hydroxide to salt out any dissolved product and then extracted with carbon tetrachloride. This extraction was added to the organic layer of the filtrate. The total organic layer, 3610 grams, was charged to a stillpot along with 5 grams of magnesium oxide. Fractional distillation gave 742 grams of 3-chloro-2,5-diethylpyrazine representing a yield of 72%.

It is apparent that the objectives of this invention have been accomplished. Broadly speaking, a new and improved method of preparing nuclear chlorinated alkylpyrazines with high conversions and yields has been provided which comprises adding the alkylpyrazine to be chlorinated to a mixture of water, chlorine and inert solvent, as herein defined, the method being carried out entirely in liquid phase.

We claim:

1. A method for preparing nuclear monochlorinated alkylpyrazines which comprises adding an alkylpyrazine selected from the group consisting of methylpyrazine, ethylpyrazine, 2,5-dimethylpyrazine and 2,5-diethylpyrazine to a liquid mixture of water, chlorine and inert solvent while the mixture is at a temperature from about 25° C. to about the boiling point of the solvent; said solvent having sufficient solvent action for chlorine and said alkylpyrazine such that the solvent facilitates contacting the chlorine and alkylpyrazine to the extent needed for a significant chemical reaction therebetween and said solvent being itself inert to said chlorination reaction, said chlorine being present to a minimum amount of 1% by weight of the solvent and the water being from about .01% to 10% by weight of the total amount of alkylpyrazine to be added.

2. A method for preparing nuclear monochlorinated alkylpyrazines which comprises adding an alkylpyrazine selected from the group consisting of methylpyrazine, ethylpyrazine, 2,5-dimethylpyrazine and 2,5-diethylpyrazine to a liquid mixture of water, chlorine and inert solvent while the mixture is at a temperature from about 25° C. to about the boiling point of the solvent; said inert solvent being selected from the group consisting of carbon tetrachloride, chloroform and mixtures thereof, said chlorine being present to a minimum amount of 1% by weight of the solvent and the water being from about .01% to 10% by weight of the total amount of alkylpyrazine to be added.

3. A method in accordance with claim 2 wherein the temperature is from 35° C. to about 50° C.

4. A method in accordance with claim 2 wherein the alkylpyrazine is methylpyrazine.

5. A method in accordance with claim 2 wherein the alkylpyrazine is ethylpyrazine.

6. A method in accordance with claim 2 wherein the alkylpyrazine is 2,5-dimethylpyrazine.

7. A method in accordance with claim 2 wherein the alkylpyrazine is 2,5-diethylpyrazine.

8. A method for preparing nuclear monochlorinated alkylpyrazines which comprises adding an alkylpyrazine admixed with water to a liquid mixture of chlorine and inert solvent; said alkylpyrazine being selected from the group consisting of methylpyrazine, ethylpyrazine, 2,5-dimethylpyrazine and 2,5-diethylpyrazine, said inert solvent being selected from the group consisting of carbon tetrachloride, chloroform and mixtures thereof, said chlorine being present to a minimum amount of 1% by weight of the solvent and the water being from about .01% to 10% by weight of the alkylpyrazine; controlling the addition rate of the alkylpyrazine such that the solvent temperature is from 25° C. to about its boiling temperature and simultaneously passing chlorine through the solvent at a minimum of 1 mol of chlorine per each mol of alkylpyrazine added.

9. The method in accordance with claim 8 wherein the solvent temperature is from about 35° C. to about 50° C.

10. The method in accordance with claim 8 wherein the amount of water admixed with the alkylpyrazine is about 1% by weight of the alkylpyrazine.

11. A method for preparing nuclear monochlorinated alkylpyrazines which comprises adding, via separate streams, water and an alkylpyrazine selected from the group consisting of methylpyrazine, ethylpyrazine, 2,5-dimethylpyrazine and 2,5-diethylpyrazine to a liquid mixture of chlorine and inert solvent and controlling the addition rate of the alkylpyrazine such that the solvent temperature is from about 25° C. to about its boiling point temperature; said inert solvent being selected from the group consisting of carbon tetrachloride, chloroform and mixtures thereof, said chlorine being present in a minimum amount of 1 percent by weight of the inert solvent and said water being from about 0.01% to 10% by weight of the alkylpyrazine.

12. A method for preparing nuclear monochlorinated alkylpyrazines which comprises adding an alkylpyrazine admixed with water to a liquid mixture of chlorine and inert solvent which is at a temperature of about 35° C. to about 50° C. and atmospheric pressure; said inert solvent being selected from the group consisting of carbon tetrachloride, chloroform and mixtures thereof, said alkylpyrazine being selected from the group consisting of methylpyrazine, ethylpyrazine, 2,5-dimethylpyrazine and 2,5-diethylpyrazine, said water being from about 0.01% to 10% by weight of the alkylpyrazine and said chlorine being present at a minimum of 1 percent by weight of said solvent; controlling the addition rate of the alkylpyrazine such that the solvent is maintained at a temperature of about 35° C. to 50° C. and, simultaneous to the adding of the alkylpyrazine, passing chlorine into the solvent at a minimum of 1 mol of chlorine per each mol of alkylpyrazine added; neutralizing and making alkaline the reacted mixture with aqueous alkaline solution, steam distilling the mixture and recovering the product by fractional distillation.

13. A method for preparing nuclear monochlorinated alkylpyrazines which comprises adding an alkylpyrazine admixed with water to a liquid inert solvent which is essentially saturated with chlorine and at a temperature of about 35° C. to about 50° C.; said alkylpyrazine being selected from the group consisting of methylpyrazine, ethylpyrazine, 2,5-dimethylpyrazine and 2,5-diethylpyrazine, said water being about 0.01% to 10% by weight of the alkylpyrazine and said inert solvent being selected from the group consisting of carbon tetrachloride, chloroform and mixtures thereof; controlling the addition rate of the alkylpyrazine such that the solvent is maintained at a temperature of about 35° C. to about 50° C. and, simultaneous to the adding of the alkylpyrazine, passing chlorine into the solvent at a minimum of 1 mol of chlorine per each mol of alkylpyrazine added.

No references cited.

UNITED STATES PATENT OFFICE
CERTIFICATE OF CORRECTION

Patent No. 3,113,132                          December 3, 1963

George E. Baxter et al.

It is hereby certified that error appears in the above numbered patent requiring correction and that the said Letters Patent should read as corrected below.

Column 1, line 45, for "$POC_3$" read -- $POCl_3$ --; column 4, line 66, for "frictional" read -- fractional --; column 7, line 29, after "from" insert -- about --.

Signed and sealed this 16th day of March 1965.

(SEAL)
Attest:

ERNEST W. SWIDER
Attesting Officer

EDWARD J. BRENNER
Commissioner of Patents